US008810063B2

(12) United States Patent
Peng

(10) Patent No.: US 8,810,063 B2

(45) Date of Patent: Aug. 19, 2014

(54) POWER SOURCE CONNECTING DEVICE

(75) Inventor: Xiao-Zhan Peng, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 563 days.

(21) Appl. No.: 13/158,440

(22) Filed: Jun. 12, 2011

(65) Prior Publication Data

US 2012/0205972 A1 Aug. 16, 2012

(30) Foreign Application Priority Data

Feb. 16, 2011 (CN) .......................... 2011 1 0040400

(51) Int. Cl.
*H02J 3/00* (2006.01)
*H02J 1/08* (2006.01)

(52) U.S. Cl.
USPC ........................................................... 307/12

(58) Field of Classification Search
USPC ........................................................... 307/12
See application file for complete search history.

(56) References Cited

U.S. PATENT DOCUMENTS

| | | | | |
|---|---|---|---|---|
| 7,762,821 | B2 * | 7/2010 | Patterson et al. | 439/121 |
| 2007/0077795 | A1 * | 4/2007 | Insalaco et al. | 439/110 |

FOREIGN PATENT DOCUMENTS

| | | | |
|---|---|---|---|
| CN | 2609236 | Y | 3/2004 |
| TW | 200720677 | A | 6/2007 |

* cited by examiner

*Primary Examiner* — Carlos Amaya

(74) *Attorney, Agent, or Firm* — Novak Druce Connolly Bove + Quigg LLP

(57) ABSTRACT

A power source connecting device includes an adapter, a rail and a plurality of power cables. The adapter connected to an external power source converts the alternating current output from the external power source to direct current. The rail electrically connects to the adapter. One end of each of the power cable connected to an electronic device, and another end of each of the power cable connects to the rail and is configured for slide along the rail together with the electronic device. The power cable remains in electrical connection with the rail during the sliding.

2 Claims, 1 Drawing Sheet

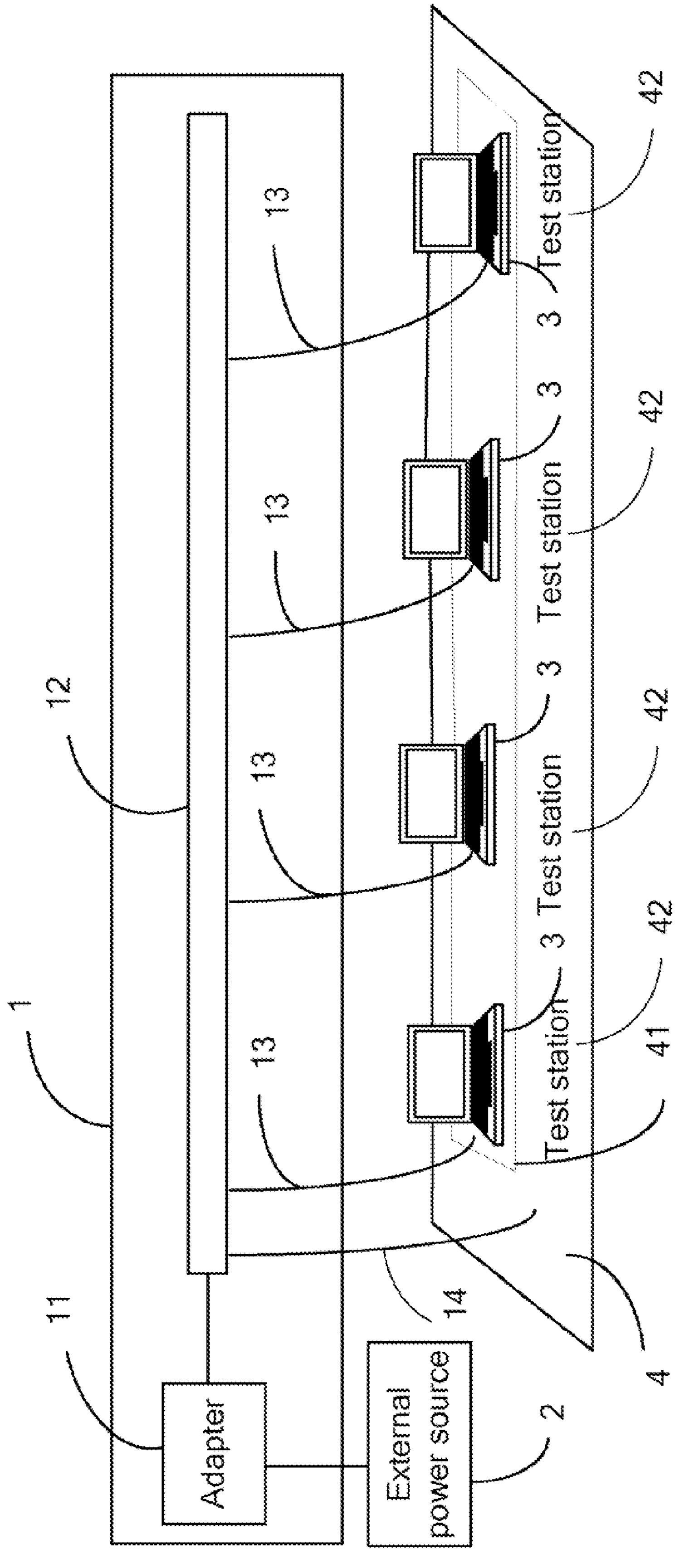
1
11
12
13
14
2
3
4
41
42
Adapter
External power source
Test station

POWER SOURCE CONNECTING DEVICE

BACKGROUND

1. Technical Field

The present disclosure relates to a power source connecting device.

2. Description of Related Art

Before being shipped from factory, various functions of electronic devices need to be tested at various test stations. While testing, because there is no battery mounted in the electronic device, the electronic device should be connected to an external power source. Thereby, after arriving at each test station for testing, the operator should connect the electronic device to the power source first, and after the test, the operator must take the electronic device off the power source, to allow the electronic device to move to the next test station. The repeated manually operations may damage the electronic device, and further result in low operation efficiency.

BRIEF DESCRIPTION OF THE DRAWINGS

The components of the drawings are not necessarily drawn to scale, the emphasis instead being placed upon clearly illustrating the principles of the present disclosure. Moreover, in the drawings, like reference numerals designate corresponding parts throughout several views.

The drawing is a schematic diagram of a power source connecting device applied to test electronic devices, in accordance with an embodiment.

DETAILED DESCRIPTION

Referring to the drawing, a power source connecting device 1 includes an adapter 11, a rail 12, and one or more power cables 13. The power source connection device 1 is connected to an external power source 2 through the adapter 11. The adapter 11 is configured for converting the alternating current output from the external power source 2 to direct current.

The rail 12 is electrically connected to the adapter 11. One end of each of the power cables 13 is connected to the rail 12 and can slide along the rail 12 while remaining in electrical connection with the rail. The other end of each of the power cables 13 is connected to an electronic device 3 to be tested.

A test machine 4 for testing the electronic devices 3 includes a rail 41 and at least one test station 42. Each test station 42 can test at least one function of the electronic device 3. The electronic devices 3 are placed on the rail 41 and can slide along the rail 41 to move from one test station 42 to another test station 42. After a test is finished in a current test station 42, the electronic device 3 is controlled to slide to the next test station 42 along the rail 41 for another test. The power cable 13 also slides to the next test station along the rail 12 together with the electronic device 3.

The power connecting device 1 further includes a static electricity preventing power cable 14. The static electricity preventing power cable 14 is connected to a metal shield net (not shown) that spreads on the surface of the test machine 4 to reduce the static electricity generated when the electronic device 3 slides along the rail 12.

Although, the present disclosure has been specifically described on the basis of preferred embodiments, the disclosure is not to be construed as being limited thereto. Various changes or modifications may be made to the embodiment without departing from the scope and spirit of the disclosure.

What is claimed is:

1. A power source connecting device comprising:

an adapter connected to an external power source to convert alternating current output from the external power source to direct current;

a rail electrically connected to the adapter; and at least one power cable, one end of each of the at least one power cable to be connected to an electronic device, and another end of each of the at least one power cable to be connected to the rail and configured for sliding along the rail together with the electronic device, the at least one power cable remaining in electrical connection with the rail during the sliding; and a static electricity preventing power cable electrically connected to a metal shield net that spreads on a surface of a test machine where the electronic device is placed on.

2. The power source connecting device of claim 1, wherein the test machine is configured to test the electronic device and includes a rail and at least one test station, each test station is configured to test at least one function of the electronic device, and the electronic device is placed on the rail of the test machine and capable of sliding along the rail of the test machine to move from one test station to another test station.

* * * * *